United States Patent [19]

Willisch

[11] 4,192,848

[45] Mar. 11, 1980

[54] DEVICE FOR PREPARATION AND HYGIENIZATION OF REFUSE OR REFUSE-CLARIFIED SLUDGE MIXTURES BY MEANS OF COMPOSTING

[76] Inventor: Hannes Willisch, Scheurenhof, 5025 Stommeln bei Koln, Fed. Rep. of Germany

[21] Appl. No.: 887,836

[22] Filed: Mar. 17, 1978

[30] Foreign Application Priority Data

Mar. 18, 1977 [DE] Fed. Rep. of Germany ....... 2711863
Mar. 18, 1977 [DE] Fed. Rep. of Germany ....... 2711907

[51] Int. Cl.² ............................. C05F 3/06; C05F 9/02
[52] U.S. Cl. .......................................... 422/239; 71/9; 71/64 JC
[58] Field of Search ..................... 23/259.1; 71/8–10, 71/14, 21, 24, 64 JC; 210/152; 422/239

[56] References Cited

U.S. PATENT DOCUMENTS 2,595,027  4/1952  Verdier .................. 71/14 X

FOREIGN PATENT DOCUMENTS 200686  10/1939  Switzerland ..................... 23/259.1

*Primary Examiner*—Frank A. Spear, Jr.
*Assistant Examiner*—Ferris H. Lander
*Attorney, Agent, or Firm*—Diller, Ramik & Wight

[57] ABSTRACT

This disclosure is directed to a device for forming a clamp of refuse or refuse-clarified sludge mixtures in reduced and prepared form for composting by thermal rotting by utilizing a pair of transversely spaced upstanding elongated perforated members defining a space therebetween for receiving refuse, and support means in the form of a pallet or pallets disposed between the upstanding members for receiving thereupon and supporting the received refuse.

20 Claims, 25 Drawing Figures

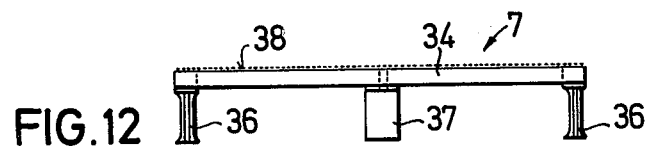
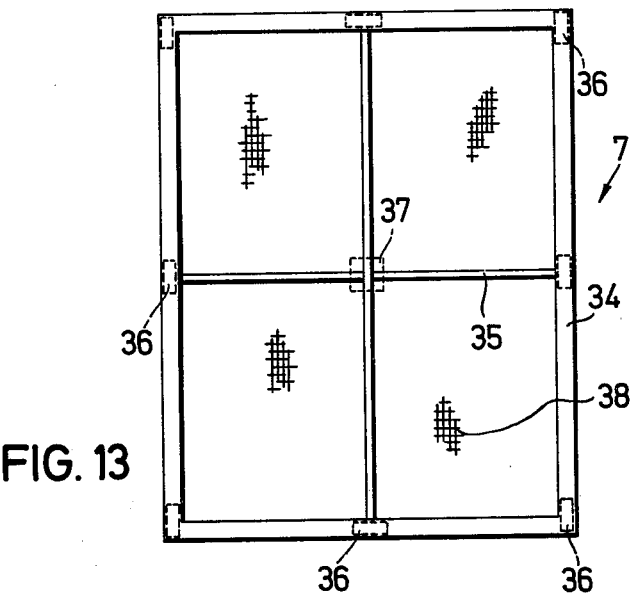
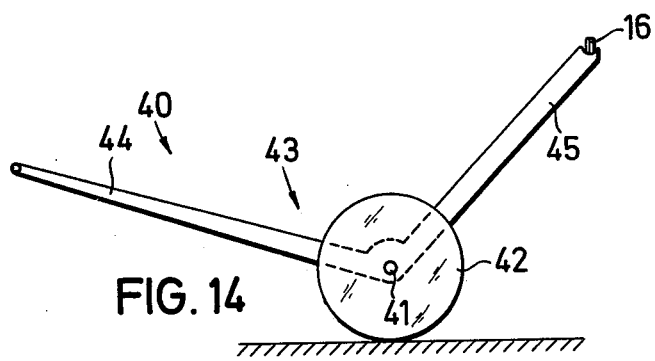
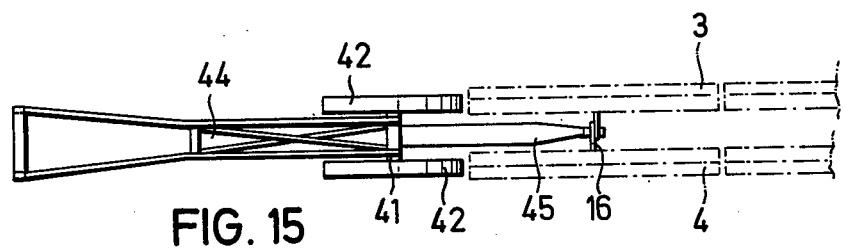

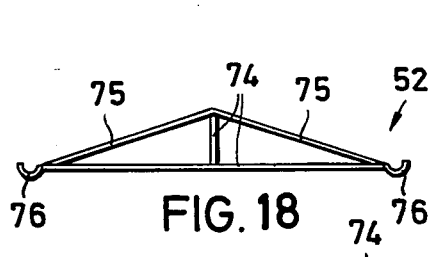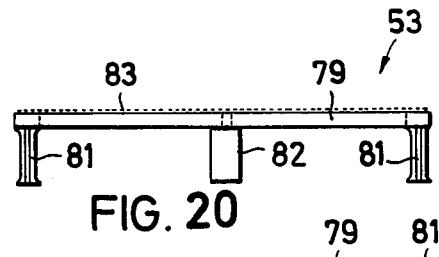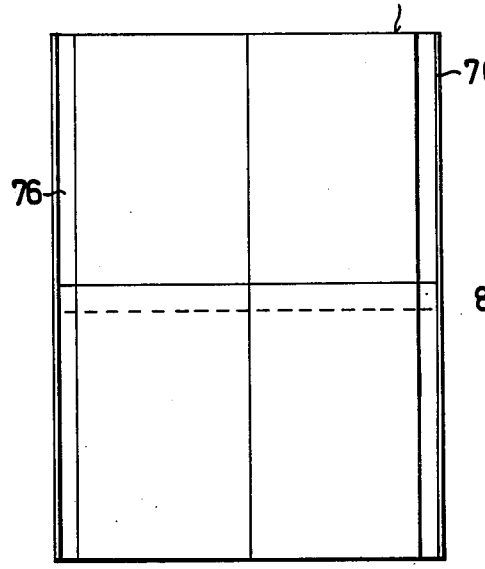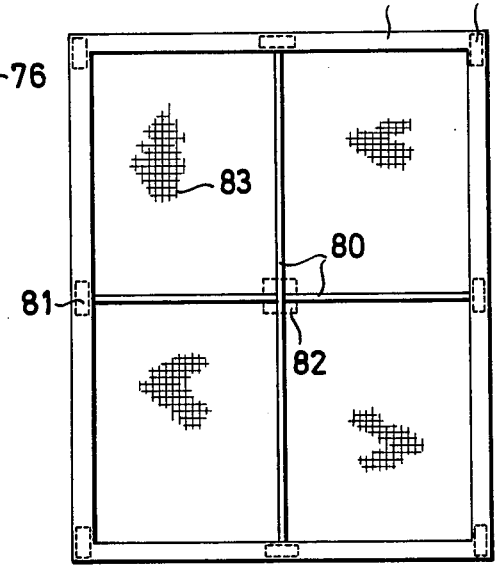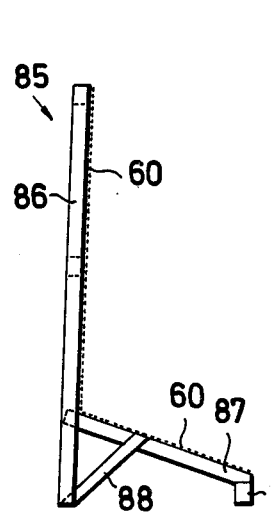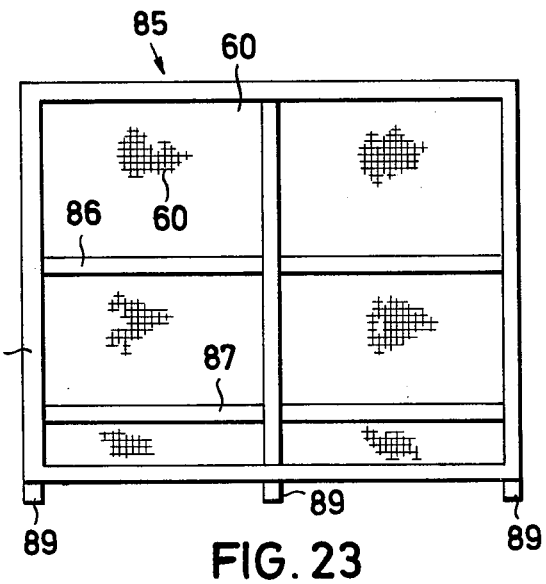

DEVICE FOR PREPARATION AND HYGIENIZATION OF REFUSE OR REFUSE-CLARIFIED SLUDGE MIXTURES BY MEANS OF COMPOSTING

This invention is directed to a device of the type set forth in applicant's co-pending application Ser. No. 734,426 filed Oct. 21, 1976 and entitled METHOD OF AND APPARATUS FOR THE TREATMENT AND PURIFICATION OF REFUSE/SEWAGE SLUDGE MIXTURES BY MEANS OF COMPOSTING.

The present invention is directed to a device for the preparation and hygienisation of refuse, such as domestic refuse, commercial refuse and the like, particularly of refuse-clarified sludge mixtures by means of composting and particularly by thermal rotting.

In forming a clamp, pile or heap of refuse or refuse-clarified sludge mixture reduced and prepared for composting, it is proposed that the clamp or pile have extending longitudinally therethrough tunnel-like hollow spaces and, if necessary or desirable, also longitudinally extending ductlike hollow spaces therethrough and vertical flue-like discharge spaces in order to obtain self-ventilation of the clamp and a continuous supply of air (oxygen). The permanent supply of air or oxygen to the rotting material is provided through the large inner-surface areas of the hollow spaces, tunnels or the like by means of thermal convection. This effects reliable rotting and hygienisation of the clamp or clamp material.

The longitudinal tunnel-like spaces are disposed at the base of the clamp and are produced by tunnel-shaped formers of a predetermined length having apertured or perforated side walls or elongated members. Preferably the apertures, perforations or screens are in a grid fashion. The longitudinal tunnels or spaces extend vertically upwardly to approximately one-half or two-thirds of the total height of the clamp and preferably the tunnel former is roughly of an ogival in tranverse cross-section. As the compost pile or heap grows vertically in the direction of loading, the tunnel formers may be withdrawn from the pile or clamp after a relatively short time so long as the clamp becomes self-supporting and can be maintained self-supporting without additional support during the entire rotting process. Preferably, the tunnels or tunnel formers are mobile and special measures are required in regard thereto for the mobility thereof, as is set forth in the latter-noted application.

The purpose of the present invention is to provide a device by which refuse material prepared for composting in clamps, piles or heaps may be rapidly and entirely rotted or dried without the occurence of putrefaction or putrefaction esters, and may be turned into a mature final product with the clamp or pile being exposed only to the surrounding air. The invention is characterized in that the tunnel formers of the compost ventilation frame are supported on support means or blocks preferably designed as pallets which extend between adjacent, transversely spaced tunnel formers, and preferably the upper surfaces of the supporting means or pallets are perforated in the form of a sieve so that air passing upwardly therethrough can aerate the clamp of refuse material supported thereupon.

A ventilation device or frame of the latter type offers the advantage that the interspaces in the clamp between the tunnel formers have a hollow base, support or pallet suitably apertured to ensure the continuous supply of air or oxygen to the clamp from beneath the refuse material forming the clamp. The development of so-called "black feet" in the clamp in which the material may putrefy is thereby avoided. The positioning of the support means or pallets between the generally upstanding formers or supports avoid points in the compost material which can cool down through contact with the surface of the earth, in the usual fashion. Even at lowest points in the pile of material, the material itself remains warm thereby enabling aerobic bacterial activity. The result of this is that no seepage can form and total automatic ventilation from below of the material supported upon the support means or pallets is obtained so that bacterial activity can proceed even at this point during the entire duration of composting providing total rotting-through of the material.

In accordance with one embodiment of the invention, walls or elongated upright members of the tunnel former are perforably arranged by having hinges carried at an apex or upper portion thereof and are preferably spanned by releasably and/or removable transverse supports located within the tunnel former of the overall device. By this construction, each pair of walls or elongated members defining each tunnel former imparts a body to the tunnel former whose structure can be kept extremely simple, consisting practically only of the sidewalls or elongated upstanding members which may be further readily collapsed inwardly relative to a longitudinal medial plane for transportation and/or storage, as well as for varying the distance between feet or lower end portions thereof to accommodate differences in spaces between adjacent lower most supporting means or pallets. Lower end portions or feet of the hinged sidewalls rest upon edges of the pallets supported on the surface or floor of a storage area and when folded together, the feet are released from the pallets so that during the dismantling procedure the pair of sidewalls or tunnel formers may be lowered vertically relative to the clamp or heap which has become self-supporting and the former or formers may then be readily removed from the clamp. In this way the former which has been dismantled from its operative or extended position can be readily removed from the tunnels or hollow spaces formed in the clamp upon its release from the lowered formers. The pallets are preferably provided with an upper surface which is perforated by apertures or is formed as a screen and the foot of one former rest upon one pallet while the foot of the same former rest upon another but transversely adjacent and spaced pallet. Thus, the pallets not only support the refuse material of the clamp but also elevate the former off the earth or other supporting surface so that the former may be dropped when the sidewalls of the former are hinged to move toward each other to a collapsed position.

In keeping with a further aspect of this invention it is possible for only lower portions of the sidewalls or elongated members of each former to be provided with longitudinal hinges so that the upper portions thereof move toward and away from each. The formers, in accordance with the latter aspect of the invention as seen in cross-section, represent a very actue-angled triangle opening upwardly with the sidewalls being planar over their entire height.

The sidewalls or upstanding elongated members of each tunnel former are internally transversely supported or reinforced, preferably by a removable or pivotable support or reinforcing linkage. The reinforcing or supporting linkage is preferably designed as a bell-crank so that the sidewalls or upstanding elongated members of the tunnel former are reliably secured in their operative or extended position as well as in the extended in-line position of the bell-crank linkage. As considerable pressures are exerted on the tunnel former and/or the hinged sidewalls or upstanding elongated members thereof (some of the clamp material reaching a height of about five meters and over), the side walls in the spread condition may if necessary be additionally reinforced by removable and adjustable reinforcing pieces or supports.

Feet of lower end portions of the tunnel formers and specifically the sidewalls or upstanding elongated members thereof may be offset vertically or inclined to the surface of the sidewall. The spread, extended or operative position of the sidewalls relative to one another results in an oblique positioning of the lower frontal surfaces of the sidewalls relative to the support means, blocks or pallets upon which the sidewalls rest. Advantageously, the feet or lower end portions of the sidewalls of the tunnel former, as seen in cross-section, have a more or less inwardly and downwardly inclined oblique surface. In this way, the sidewalls are readily folded from their extended position to a collapsed position by merely sliding readily from surfaces of adjacent pallets. In a preferred embodiment of the invention, the feet of the tunnel formers, and specifically the upstanding members or sidewalls thereof are provided with lowermost angled recesses in which a transverse surface is obliquely inclined. The latter construction affords reliable supports in the spread or in-use position of the tunnel former sidewalls upon the pallets and additionally it is possible to fold or collapse the sidewalls of the tunnel formers without any special or additive application of force or power.

In further accordance with this invention a novel device is provided for folding the sidewalls of the tunnel formers from their in-use of spread position to their collapsed position by means of a simple carriage assembly having but a single handle, operative arm, axle and a wheel carried by the latter. The handle and arm jointly define a bell-crank lever with the junction thereof forming the axis of the shaft and serving as a fulcrum such that as an end of the arm engages in the area of the hinges of the tunnel formers and the handle is pushed downwardly, the tunnel formers are slightly elevated, the feet thereby being released from the pallets, readily thereafter automatically collapsed under the weight of the sidewalls, lowered and then removed by simply pulling the carriage assembly from the now self-supporting clamp or pile of material.

In further accordance with this invention each tunnel former is constructed as a double-walled former with suitable apertures and with adjacent double-walled formers being spanned by a roof overlying the perforated support means or pallets. A structure of the latter type for the drying of prepared refuse material and also for its total composting has many advantages. For example, the framework consisting of the double-walled, interrupted or apertured longitudinal formers and the roofs or roof sections are simple in structure, easily handled, and may be enlarged or reduced depending upon the amount of refuse available. On the other hand, the ventilation tunnel frame has the advantage that the compost clamp which is developed upon the pallet and between the doubled-walled formers is located entirely in the open air so that the surrounding air has free access to the clamp or its various sections. On the other hand, the clamp is so subdivided by the double-walled longitudinal formers that the cross-section of the clamp is sufficiently penetrated by hollow spaces which are in free contact with the surrounding air. The formers with interrupted wall sections allow access to the air over the entire surface of the formers. Thus, the formers may be located at such a spacing between each other that the clamp sections located between the formers are exposed to automatically ventilation such that adequate amounts of air which are required for aerobic fermentation is readily and sufficiently available. The thermal convection caused by the fermentation itself brings about continuous gas exchange by means of which odorless and total composting for drying and obtaining the final product is ensured. Moreover, the roofs or roof sections provide protection against the direct effects of rain, snow and the heat of the sun. Thus, the refuse-clarified sludge compost are no longer exposed to extreme environmental conditions. Furthermore, outermost zones of the compost body, clamp or clamp sections are not saturated or compacted by heavy rain or snow thereby avoiding the formation of anaerobic layers or strata which might impede the continuous ventilation of the entire clamp or clamp body. The roof sections may be used optionally independent of weather conditions and other requirements. These roof sections are easily handled, removed and may be stacked. This also applies to the double-walled longitudinal sidewalls of the tunnel formers. The compost area may be used as required. The drying of the refuse material to a moisture content of, for example, 20 to 25 percent is achieved at a relatively low cost and with the latter low moisture content, burning or combustion of the clamp material is possible without the need of further combustion fuels. Another considerable advantage is that there is no dependence on a supply of fresh refuse material. A layer of dried compost may be formed enabling the burning process to be carried out continuously or only at determined times, for example, at power-peak periods. The ventilation device according to this invention enables the release of undesirable moisture from the refuse without the use of any external energy for this purpose, and this is achieved simply by appropriately storing the clamped material. At the same time it is ensured that the material may be composted to full maturity and the entire procedure is virtually odorless and may be carried out in areas with extreme weather conditions.

In further accordance with this invention the longitudinal tunnel formers are advantageously designed so that as viewed in front elevation, they taper in a downward direction and in this case, the wider or spread upper end portions of the longitudinal tunnel formers, or more specifically the upstanding members or sidewalls thereof, may be covered by a top plate or roof. Further, the tunnel formers may be fitted with vertically adjustable feet and the feet may also carry rollers. Additionally, there may also be located within each tunnel former between the elongated upstanding walls, sidewalls or wall sections mechanical or hydraulic lifting elements, such as mechanical jacks or hydraulic jacks, so that upon operation the tunnel formers may be selectively raised and lowered. Thus the tunnel formers may be raised vertically for removal out of the clamp body when the composted material has obtained sufficient internal support by fungus formation as a result of bacterial activity. As seen in cross-section, the tunnel formers of this type in which the sidewalls diverge in an upward direction are spanned by top plates of a rooflike configuration and moreover adjacent tunnel formers are also spanned by a roof either or both or which may have a flattened central section serving as a catwalk.

The roofs or roof sections spanning both the sidewalls of a single tunnel former or adjacent sidewalls of a pair of tunnel formers have suitable frame pieces with roof-like inclined cover portions and are of an easily handled size. Preferably the roofs are appropriately provided with clamping or securing means, such as hooks, clamps or the like for joining the roofs or plates to adjacent upper end portions of the sidewalls of a single tunnel former or to the sidewalls of a pair of adjacent tunnel formers. Gutters for rain or melting snow may also advantageously be provided on both sides of the plates, covers or roofs so that any water which might otherwise flow into the clamp is precluded from doing so and is immediately drawn off to an area at which the clamp will not be adversely affected thereby.

Preferably, the longitudinal tunnel formers, the sidewalls or upstanding elongated members thereof, and the base portions, supports or pallets are designed as frames or frameworks provided with perforated coverings or screens, perforated plates, grid networks and/or corrugated grids.

With the above and other objects in view that will hereinafter appear, the nature of the invention will be more clearly understood by reference to the following detailed description, the appended claims and the several views illustrated in the accompanying drawings.

IN THE DRAWINGS:

FIG. 12 is a side elevational view of a support, block or pallet atop which is a screen, grid or perforated plate.

FIG. 13 is a top plan view of the pallet of FIG. 12, and illustrates details thereof including the disposition of a plurality of spaced supporting feet.

FIG. 14 is a diagrammatic side elevational view of a novel device in the form of a carriage assembly, and illustrates a wheel and axle joined at a juncture of a handle and arm for imparting an upward force to a tunnel former for collapsing the same prior to withdrawal from a clamp.

FIG. 15 is a diagrammatic top plan view of the carriage assembly of FIG. 14, and illustrates the manner in which an end portion of the arm is disposed between adjacent sidewalls of a tunnel former shown in phantom outline.

FIG. 18 is a diagrammatic front view of a roof having gutters which stands adjacent tunnel formers in the manner shown in FIG. 16.

FIG. 19 is a top plan view of the roof of FIG. 18.

FIG. 20 is a side view of a pallet while FIG. 21 is a top view of a pallet, and the latter structure corresponds to that illustrated in FIGS. 12 and 13.

FIG. 22 is a side view of an upstanding end wall, and illustrates the grid or perforated plate construction thereof with the end wall being utilized at axially opposite ends of the clamp.

FIG. 23 is a front view of the structure of FIG. 22.

Figure 1:
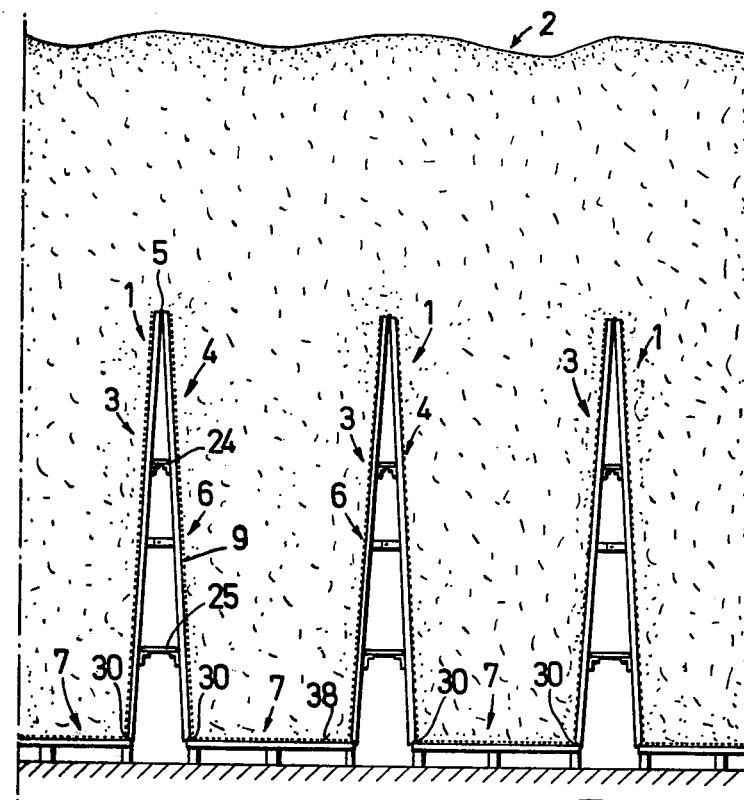
FIG. 1 is a side elevational view of a plurality of devices constructed in accordance with this invention and illustrates three tunnel formers or frames, each defined by upstanding elongated sidewalls hinged at upper end portions thereof and having lower end portions whose feet rest atop supporting means or pallets upon which the refuse material is piled to form the clamp.
Figure 2:
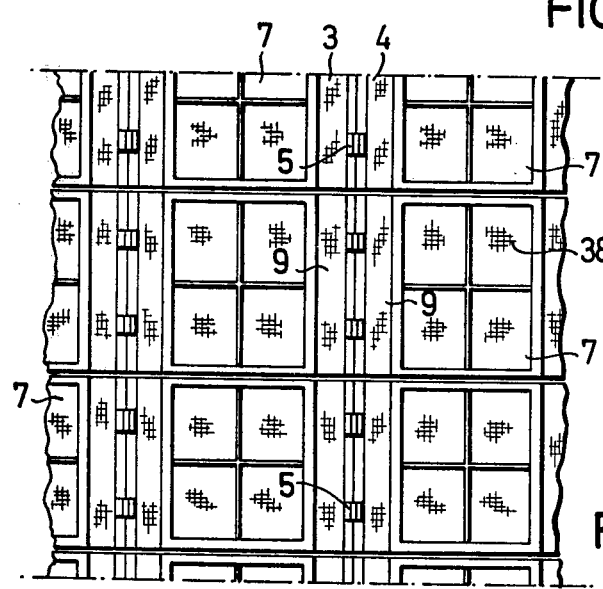
FIG. 2 is a fragmentary top plan view of the device of FIG. 1 with the refuse or clamp material removed, and illustrates the manner in which the tunnel formers and pallets are provided with screens or grids for ventilation and air passage purposes.
Figures 3, 4:
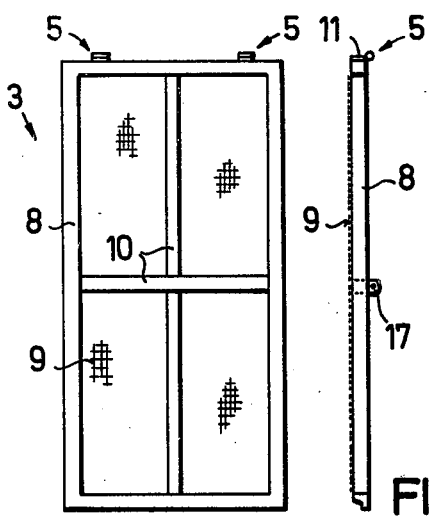
FIG. 3 is a diagrammatic front elevational view of one of the sidewalls or upstanding elongated members, and illustrates a frame supporting a grid, screen or perforated plates and hinges at an upper end portion thereof.
FIG. 4 is a side elevational view of the sidewall of FIG. 3, and more clearly illustrates details thereof including a bracket for connecting thereto a reinforcing element.
Figure 5:
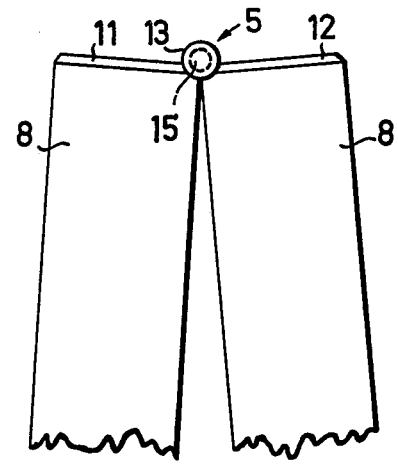
FIG. 5 is an enlarged fragmentary side elevational view of upper end portions of a pair of sidewalls of one of the tunnel formers, and illustrates the manner in which the same are connected to each other by a hinge.

A plurality of novel devices constructed in accordance with this invention for forming a clamp of refuse or refust-clarified sludge mixtures in reduced and prepared form for composting by thermal rotting are each generally designated by the reference I (FIGS. 1 and 2) and are in the form of longitudinal tunnel formers which make tunnelshaped spaces or recesses in a clamp, pile or heap of compostable refuse or refuse-clarified sludge mixtures 2. Each device or former 1 has a pair of walls or elongated upstanding members 3 and 4 provided with perforations which are preferably sieve-like in design. The walls or elongated upstanding members 3, 4 are preferably plannar and include at upper end portions thereof (unnumbered) a plurality of hinges 5 (FIGS. 1-5). The walls 3, 4 may be spread toward or away from each other through the utilization of a bellcrank or pivot linkage 6 (FIGS. 8 and 9) which also functions as a transverse reinforcing member when the walls 3, 4 are in their in-use or spread position (FIGS. 1 and 2). When in the spread, extended or in-use position, the devices or tunnel formers 1 are supported by elevated supporting means, support blocks or pallets 7 which are in transversely spaced relationship to each other (FIG. 1). The pallets 7 are preferably provided with perforated upper surfaces, perforated plates, screens, or other like apertured structure of a sieve-like design. The tunnel formers 1 and the pallets 7 collectively form a ventilation frame for the clamp body 2 in a vertical direction and also provide a base surface in order that the clamp or clamp body 2 which is elevated by each pallet 7 can not come into contact with the earth or like supporting surface, whereas atmospheric air or oxygen may travel upwardly from beneath the pallets therethrough and into the clamp 2. The air also can travel through the perforated sidewalls 3, 4 and the latter collectively enables the continuous supply of air or oxygen to the clamp body 2 into its interior through its sides as well as from below. During the entire maturing and storing time of the clamp 2, the oxygen supplied by the air from all sides and beneath carries out physical and chemical exchanges in the reduced refuse-waste waters. It is thus ensured that the required oxygen for the exchange of materials in the clamp 2 is so richly available that total composting of the clamp 2 takes place without odor formation, and turnover of the clamp 2 during the rotting and storage time is not required.

Figure 6:
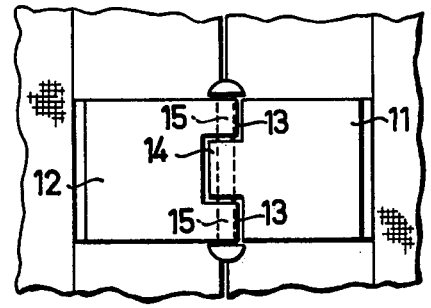
FIG. 6 is a fragmentary top plan view of the structure of FIG. 5, and more clearly illustrates details of the hinge.

The walls 3, 4 each consists of a frame or framework 8 of metallic or plastic material of a generally rectangular or polygonal outline having a plate or plates 9 perforated in sieve fashion. A covering of sieve mats, perforated sheet metal or corrugated grid wire may be provided. The framework 8 consists of a reinforced cross frame 10 and the uppermost cross piece (unnumbered) of each frame 8 has secured thereto flexible or pivoted hinges 5. Additionally upper frontal sides of each frame or framework 8 carries straps 11, 12 of each hinge 5 and eyes 13, 14 (FIG. 6) are interengaged and connected together by a hinge pin 15. Obviously, any type of other suitable or equivalent means may be utilized for articulately, hingeably and/or pivotally connecting together the upper end portions of the sidewalls 3, 4 of each device or tunnel former 1.

Figure 7:
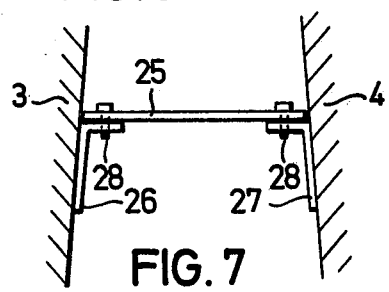
FIG. 7 is a side elevational view of the space between a pair of sidewalls of one of the tunnel formers, and illustrates a removable reinforcing member spanning the same in an operative position.
Figure 8:
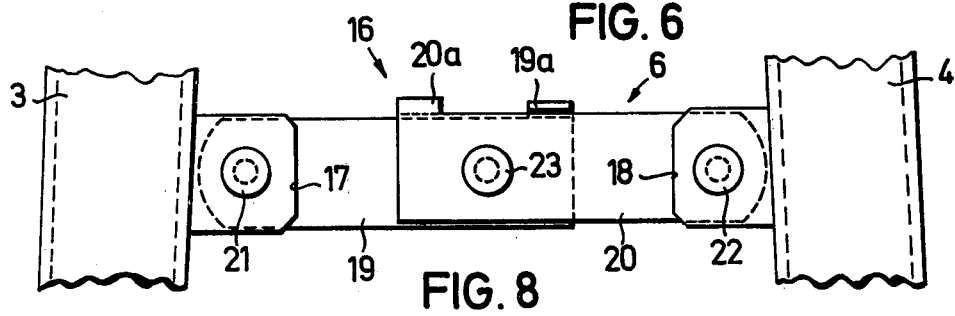
FIG. 8 is a fragmentary side elevational view of a pair of sidewalls of one of the tunnel formers, and illustrates a reinforcing element pivotally connected between the sidewalls with the reinforcing element being in the form of a bell-crank linkage.
Figure 9:
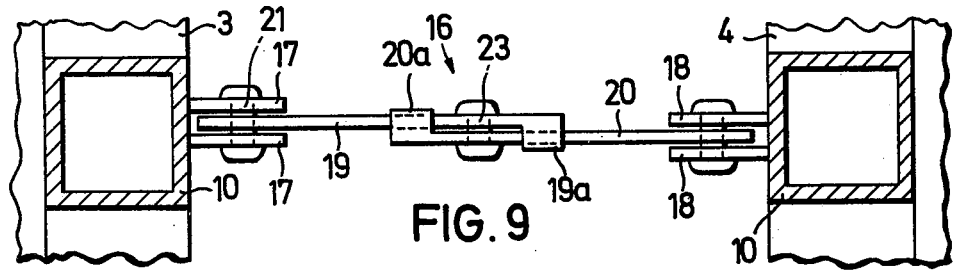
FIG. 9 is a fragmentary top plan view looking downwardly in FIG. 8, and illustrates details of the bell-crank linkage.

The walls 3, 4 of each tunnel former 1 are held in the extended or spread position (FIGS. 1, 8 and 9) by at least a single pivoted reinforcing linkage 6 which is preferably constructed as a bell-crank linkage or member 16. For this purpose fitments 17 and 18 are rigidly connected to the framework 8 of each of the walls 3, 4 respectively, and lever arms 19 and 20 are pivotally connected thereto by bolts 20, 22 while the lever arms 19, 20 are commonly connected to each other by a bolt 23. The ends (unnumbered) of the lever arms 19, 20 have projecting fingers 19a, 20a by means of which each linkage 16 is secured in its extended in-line position (FIGS. 8 and 9). Through the use of a force acting upwardly on the linkage 16, as viewed in FIG. 8, the arms 19 and 20 are pivoted relative to one another at an acute angle and the walls 3, 4 can thus be pivoted from their spread position to their collapsed position through a novel device to be described hereinafter. Additional adjusting and/or reinforcing pieces 24, 25 may be provided in order to assure that the spread or in-use position of the wall sections 3, 4 are retained and the latter do collapse under the weight of the material of the clamp 2. The adjusting pieces 24 and 25 may consists of rigid straps (FIG. 7) held fast by thrust bolts 28 or the like on angle irons or brackets 26, 27 fixed to the walls 3, 4. The bolts 28 may be secured by split pins, cotter keys or the like. The straps 24, 25 are thus readily releasable from the angle irons 26, 27 so that the wall sections 3, 4 may be collapsed without great difficulty or an inordinate amount of time.

Figure 10:
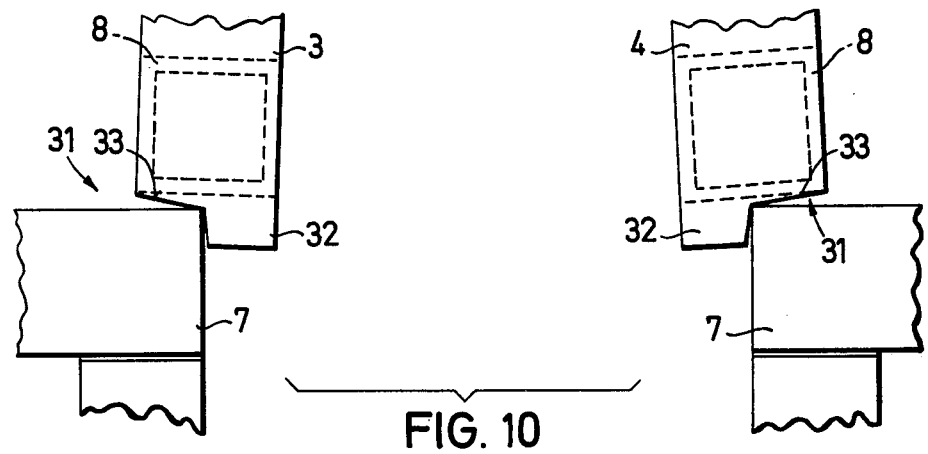
FIG. 10 is a fragmentary enlarged view of lower end portions of the sidewalls of one of the tunnel formers having recesses in feet thereof resting upon supports or pallets which are in transversely spaced relationship.

Inasmuch as the lower end portions of the walls 3,4 rest atop the pallets 7, the feet or lower surfaces 30 thereof are of an oblique shape so that the collapsing of the walls 3, 4 may be achieved relatively easy. Advantageously, lower frontal surfaces of the walls 3, 4 at the feet 30 are provided with angular recess means 31 with a projecting portion 32 (FIG. 10) bearing against the corners or edges of the pallets 7 (FIG. 10) in a transverse direction to the walls 3, 4. The oblique surfaces 33 ensure that the walls 3, 4 slip easily off the pallets 7 during the folding or collapsing procedure.

The pallets 7 are advantageously polygonal as viewed in top plan (FIG. 13) and each includes a framework 34 which may be internally reinforced by a cross-shaped member 35. The framework 34 is provided with feet 36 and 37, the latter being centrally located at the intersection of the cross-shaped member 35. The pallet 7 is provided on an upper surface thereof with a sieve-like perforated plate 38. A covering in the form of a sieve mat, a perforated metal sheet or a corrugated wire grid may be provided. In this way the entire base or supporting surface 38 of the pallet 7 is air-permeable.

Figure 11:
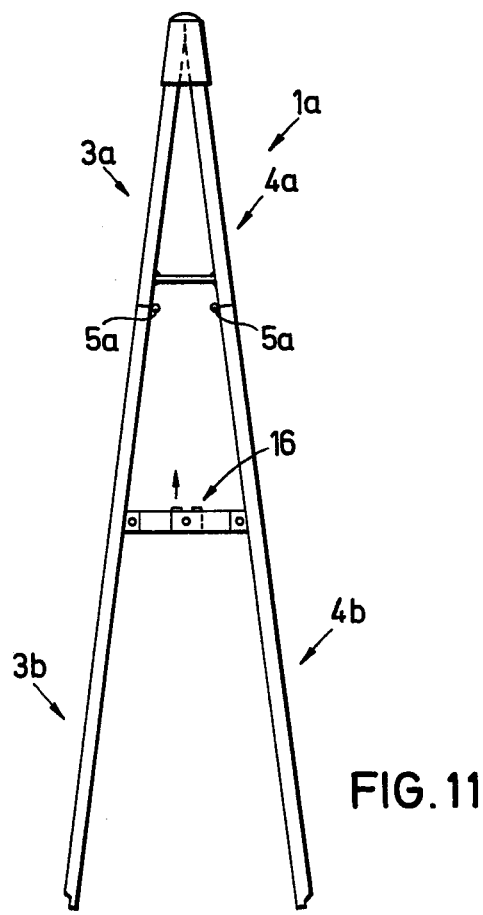
FIG. 11 is a side elevational view of another tunnel former of this invention, and illustrates a pair of sidewalls or upstanding members having upper and lower end portions with the upper end portions being hinged below an apex thereof.
Figures 16, 17:
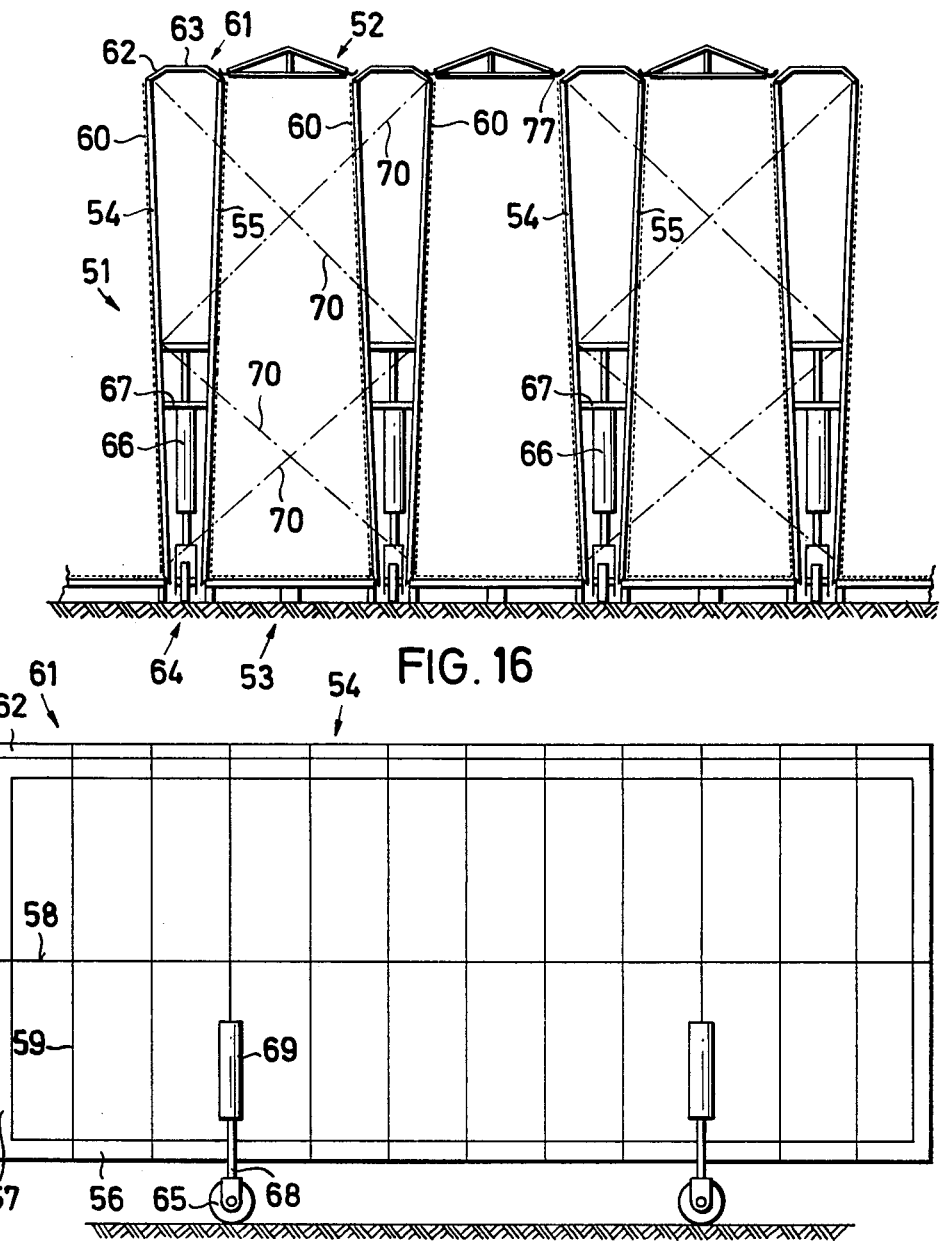
FIG. 16 is a front elevational view of another device constructed in accordance with this invention in which each tunnel former is formed by a pair of upwardly diverging sidewalls or upstanding elongated members, and hydraulic means are utilized for elevating and lowering the same.
FIG. 17 is a side elevational view of one of the tunnel formers of FIG. 16, and illustrates the manner in which the hydraulic or similar lifting and lower means are carried by rollers for moving the tunnel formers relative to self-supporting clamps.
Figure 24:
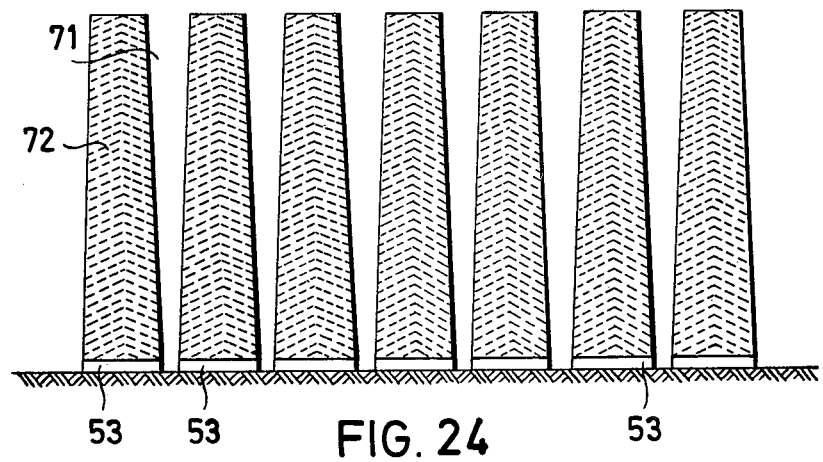
FIG. 24 is a diagrammatic front view of a plurality of clamps or clamp sections after the tunnel formers, roofs, etc. have been removed with each clamp resting atop a pallet.

Reference is now made to FIG. 11 which illustrates a further embodiment of a device or tunnel former 1a constructed in accordance with this invention in which the upper end portions 3a, 3b of the sidewalls or elongated upstanding members (unnumbered) are pivotably connected by respective hinges 5a, 5a to lower end portions 3b, 4b of the sidewalls. The upper portions or sections 3a, 4a are fixed at a definite angle relative to each other and are secured in this position by a cap (unnumbered). However, due to the pivot means or hinges 5a, 5a, the lower end portions 3b, 4b can be pivoted from the use position to the collapsed position by simply applying an upward force to the bell-crank linkage 16 in the manner indicated by the unnumbered headed arrow in FIG. 11. A device of this type is desired when the height of the tunnel formers is extremely high.

The tunnel formers or devices 1, 1a with their planar and air-permeable walls 3, 4 may reach a height of up to about three meters. In the spread or extended positions, they have width at the feet or lower end portions of approximately 0.4 meters. The length of each device or tunnel former 1, 1a is on the average of approximately 1.5 meters, and a number of the tunnel formers 1, 1a may be utilized (1) adjacent each other in the manner clearly apparent from FIG. 2 in order that the longitudinal length of the clamp 2 may be varied, built up progressively in longitudinal direction, removed in a like longitudinal direction, etc.

Each of the pallets 7 has a width of approximately 1.20 meters and the length there of advantageously corresponds to the length of each of the sidewalls 3, 4 of the formers 1, 1a with a distance of approximately 1.50 meters being preferred. The height of the pallets 7 as is determined by the feet 36, 37 is approximately 15 to 20 centimeters.

In order to collapse the walls 3, 4 of the device or tunnel former 1, means are provided in the form of a carriage assembly 40 (FIGS. 14 and 15) which has an axle or shaft 41 and a pair of wheels 42. A rigid crank or bellcrank 43 is pivotally connected at the axle 41 and includes an arm 44 and a handle 45 at an angle to each other. The purpose of the arm 45 is for an upwardly opening concave face thereof (unnumbered) to engage beneath the pivot linkage 16 when the sidewalls 3, 4 are in their spread or locked position (FIGS. 8 and 9). As a downward force is applied to the handle 44, the arm 45 pivots upwardly raising the arms 19, 20 of the linkage 16 and pivoting the same about the pivot pin 23 thus collapsing or folding the walls 3, 4 toward each other. In this manner, the feet of the walls 3, 4 are also additionally automatically slipped off the edges of the pallets 7, the tunnel former 1 is lifted upwardly slightly, and thereafter the tunnel former 1 may be slightly lowered and removed by simply withdrawing the carriage assembly by pulling the handle 44 and, obviously, this procedure may be effected by a single person.

Reference is now made to FIGS. 16 through 25 of the drawings which illustrates other devices or tunnel formers constructed in accordance with this invention for setting up a clamp of refuse or refuse-clarified sludge mixtures for drying or composting by thermal rotting. Each of the devices or longitudinal tunnel formers 51 are in spaced relationship to each other and between each is a support or pallet 53 above which is a roof or cover 52 which is applied only after the space above the pallet 53 and between adjacent tunnel formers 51 has been filled with the compost refuse.

Each of the devices or tunnel formers 51 includes walls 54, 55 which diverge in an upward direction so that each former 51 tapers in a downward direction which is opposite to the formers or devices 1, 1a, heretofore described. The walls advantageously consists of a frame or framework of longitudinal and transverse bars 56, 57 which may be reinforced by longitudinal and transverse beams 58, 59. Outer sides (unnumbered) of the walls 54, 55 are perforated and they have a covering 60 of a corrugated screen, sieve plates or the like. The device or tunnel former 51 is covered at the top by a top plate 61 which has a roof-like surface 62 with a flat central section 63 to serve as a catwalk.

Each of the devices 51 is provided with means 64 for elevating, lowering and moving the tunnel formers 51 relative to each other and to the associated clamps. The means 64 are preferably carried by rollers 65 connected to a rod 68 of a fluid cylinder 69 which is in turn connected to a rigid cross piece 67, spanning and connected to walls 54, 55 of the tunnel former 51. Suitable diagonal reinforcements 70 may connect together adjacent ones of the tunnel formers or devices 51, 51 on a rolling framework constituted by adjacent pairs of the lifting devices 64 and the rolls 65 carried thereby. By raising the formers 51 relative to the rolls 65 through the elevating means 64, each former 51 is released from the downwardly tapering gap 71 between adjacent clamps or clamp sections 72 and thereafter the formers may be moved longitudinally out of the compost clamp.

Each roof element 52 is also designed as a frame section 74 (FIG. 18) having roof-like inclined cover sections 75. At the sides of the roof section 52, there are advantageously located gutters 76 for collecting and removing rain or snow water. The roof elements 52 are preferably provided with connecting means (not shown) for removably attaching the same to the tunnel formers or devices 51. The roof elements 52 are preferably of an easily-handled size and may engage by means of the gutter 76 in fittings 77 (FIG. 16) on the tunnel formers 51. As the tunnel formers are thus reinforced against one an other at the ends, it is sufficient to set the roof elements upon the edges (unnumbered) of the tunnel formers 51 in the manner readily apparent in FIG. 16.

Much as in the case of the support means or pallets 7 of FIGS. 1, 12 and 13, like pallets 53 are provided having a framework 79 which may be reinforced by a cross piece 80 (FIGS. 20 and 20). The framework 79 is provided with feet 81 and 82, and an upward surface (unnumbered) of the pallet 53 is provided with an apertured plate 83, e.g., in the form of a sieve plate or a covering of corrugated grid or the like. The size of the pallet 53 may approximately be the same as that, though slightly larger, then the roofs or roof element 52 thereabove.

The outer edges (unnumbered) of the compost clamp at longitudinal ends thereof are advantageously formed by end wall sections 85. The end wall sections 85 are advantageously of an angular shape and consists of vertically or slightly inclined frames 86 and the base section 87 which extends in an oblique downward incline. For this purpose reinforcements 88 and 89 are provided. Inner surfaces (unnumbered) of the frame 86 and the base section 87 are appropriately provided a covering 60 of corrugated grid, wire netting, sieve plate or the like. The width of the end section is advantageously adapted to that of the roofs or roof section 52 and/or the pallet 53.

The tunnel formers or devices 51 have a height of approximately 5 meters, and the spacing between the formers 51 is advantageously in the range of approximately 1.30 meters to 1.70 meters, preferably 1.5 meters. The latter total structure including the tunnel formers 51, pallets 53, roofs, roof section or plates 52, 63 and the pallets 53 define the overall ventilation framework and collectively provide for the erection of clamps of about 50 meters in length and 12 meters in width. The longitudinal length of the formers may be 10 to 15 meters, perferably 12 meters.

Figure 25:
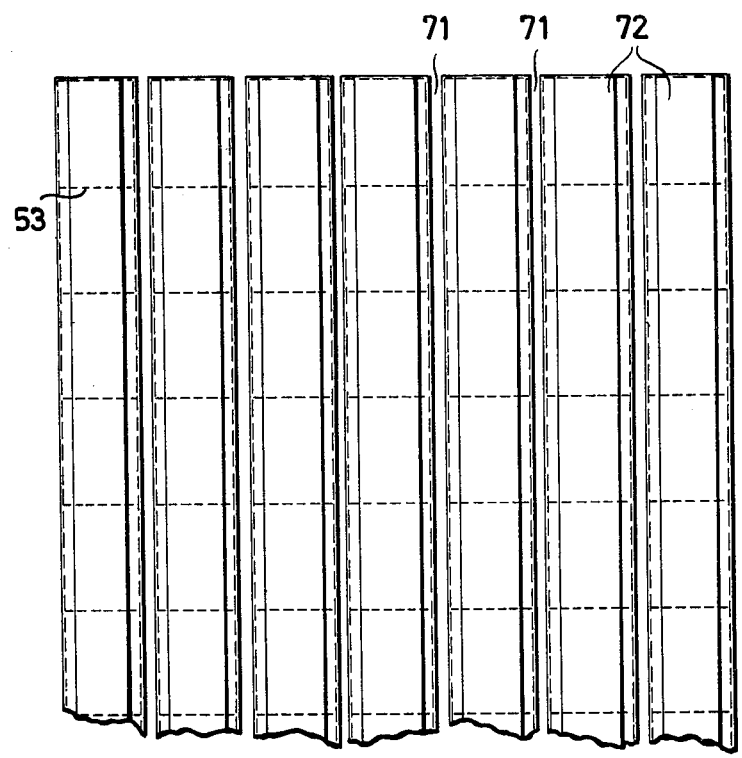
FIG. 25 is a top plan view of the plurality of pallet-supported clamps of FIG. 24.

The roofs, pallets, and walls or upstanding members are located next to one another in adjacent corresponding numbers as is most readily apparent from FIGS. 2 and 25 of the drawings. Once the formers are removed, and if they are removed totally, the clamp section 72 appears in the manner shown in FIGS. 24 and 25 resting upon the pallets 53. The pallets may now be utilized for the purpose of permiting aeration through the bottom of the clamp 72 but also for the receipt of the tines or fork of a pallet lift truck for transportation purposes. Until such time as the overall ventilation framework is removed and due to the easy handling of the components thereof, the clamp can not be adversely effected by rain, snow, etc., and all elements may be left in place until the clamp has obtained a reliable degree of self-support by aerobic bacterial activity and fungus formation. Thereafter the roofs may be moved, the formers withdrawn, and by this time the clamp body or its sections have developed such internal heat that any moisture from the outside does not impair the further fermentation process. In this condition (FIG. 24 and FIG. 25) the composted material is also sufficiently dried so that it may be used for combustion without any further drying procedures being required.

Although only a perferred embodiment of the invention has been specifically illustrated and described herein, it is to be understood that minor variations may be made in the device without departing from the spirit and scope of the invention, as defined in the appended claims.

I claim:

1. A device for forming a clamp of refuse or refuse-clarified sludge mixtures in reduced and prepared form for composting by thermal rotting comprising a pair of movable transversely spaced upstanding wall means defining a space therebetween for receiving refuse, at least one of said pair of upstanding wall means being defined by a pair of upstanding elongated at least partially transversely spaced members having upper and lower end portions, support means disposed between said pair of movable upstanding wall means for receiving thereupon and supporting the received refuse, said support means including means for passing air therethrough whereby the refuse can be aerated thereby, and means for facilitating the removal of said movable upstanding wall means by moving the same sidewise away from said support means whereby refuse received upon said support means remains supported upon the latter in the absence of said movable upstanding wall means.

2. The device as defined in claim 1 including releasable means spanning said elongated members interiorly thereof for reinforcing the same.

3. The device as defined in claim 1 wherein said lower end portions terminate in feet, and a foot of each of said elongated members rests against said support means on opposite sides thereof.

4. The device as defined in claim 1 wherein said upstanding elongated spaced members have aperture means therein for passing air therethrough whereby the refuse can be aerated thereby.

5. The device as defined in claim 4 including means for adjustably supporting said pair of upstanding means for vertical adjustment, and means for rollingly moving said pair of upstanding wall means relative to said support wall means.

6. The device as defined in claim 5 wherein said adjustable support means include a telescopic jack.

7. The device as defined in claim 4 including means for forming a roof spanning said upper end portions, and gutter means carried by said roof means.

8. The device as defined in claim 7 including connector means for releasably connecting said roof means to said upper end portions.

9. The device as defined in claim 4 wherein said support means is a pallet.

10. The device as defined in claim 4 including end plates transversely spanning said pair of upstanding means at opposite longitudinal ends thereof.

11. The device as defined in claim 1 wherein said support means is a pallet.

12. The device as defined in claim 11 including hinge means at said upper end portions for hinging together said elongated members thereby selectively varying the distance between the lower end portions thereof.

13. The device as defined in claim 12 wherein said lower end portions terminate in feet, a foot of each of said elongated members rests against said support means on opposite sides thereof, recess means at the underside of said feet, and said recess means being inclined toward each other in downwardly converging relationship relative to said support means.

14. The device as defined in claim 1 including a cover spanning said upper end portions of said pair of spaced members.

15. A device for forming a clamp of refuse or refuse-clarified sludge mixtures in reduced and prepared form for composting by thermal rotting comprising a pair of transversely spaced upstanding wall means defining a space therebetween for receiving refuse, support means disposed between said pair of upstanding wall means for receiving thereupon and supporting the received refuse, and means for facilitating the removal of said upstanding wall means away from said support means whereby refuse received upon said support means is supported upon the latter in the absence of said upstanding means, at least one of said pair of upstanding means is defined by a pair of upstanding elongated members having upper and lower end portions, and said facilitating means being defined in part by hinge means at said upper end portions for hinging together said elongated members and for bringing said lower end portions close together prior to the withdrawal of said upstanding wall means away from said support means.

16. A device for forming a clamp of refuse or refuse-clarified sludge mixtures in reduced and prepared form for composting by thermal rotting comprising a pair of transversely spaced upstanding means defining a space therebetween for receiving refuse, support means disposed between said pair of upstanding means for receiving thereupon and supporting the received refuse, means for facilitating the removal of said upstanding means away from said support means whereby refuse received upon said support means is supported upon the latter in the absence of said upstanding means, at least one of said pair of upstanding means is defined by a pair of upstanding elongated members having upper and lower end portions, said lower end portions terminate in feet, a foot of each of said elongated members rests against said support means on opposite sides thereof, and recess means at the underside of each of said feet for resting upon said support means.

17. A device for forming a clamp of refuse or refuse-clarified sludge mixtures in reduced and prepared form for composting by thermal rotting comprising a pair of transversely spaced upstanding means defining a space therebetween for receiving refuse, support means disposed between said pair of upstanding means for receiving thereupon and supporting the received refuse, means for facilitating the removal of said upstanding means away from said support means whereby refuse received upon said support means is supported upon the latter in the absence of said upstanding means, at least one of said pair of upstanding means is defined by a pair of upstanding elongated members having upper and lower end portions, said lower end portions terminate in feet, a foot of each of said elongated members rests against said support means on opposite sides thereof, recess means at the underside of said feet, and said recess means being inclined toward each other in downwardly converging relationship relative to said support means.

18. A device for forming a clamp of refuse or refuse-clarified sludge mixture in reduced and prepared form for composting by thermal rotting comprising a pair of transversely spaced upstanding means defining a space therebetween for receiving refuse, support means disposed between said pair of upstanding means for receiving thereupon and supporting the received refuse, means for facilitating the removal of said upstanding means away from said support means whereby refuse received upon said support means is supported upon the latter in the absence of said upstanding means, at least one of said pair of upstanding means is defined by a pair of upstanding elongated members having upper and lower end portions, said lower end portions terminate in feet, a foot of each of said elongated members rests against said support means on opposite sides thereof, and said feet terminate in end faces continuously inclined toward each other in downwardly converging relationship relative to said support means.

19. A device for forming a clamp of refuse or refuse-clarified sludge mixtures in reduced and prepared form for composting by thermal rotting comprising a pair of transversely spaced upstanding means defining a space therebetween for receiving refuse, support means disposed between said pair of upstanding means for receiving thereupon and supporting the received refuse, means for facilitating the removal of said upstanding means away from said support means whereby refuse received upon said support means is supported upon the latter in the absence of said upstanding means, at least one of said pair of upstanding means is defined by a pair of upstanding elongated members having upper and lower end portions, hinge means at said upper end portions, hinge means at said upper end portions for bringing together said elongated members thereby selectively varying the distance between the lower end portions thereof, and means for elevating said one upstanding means whereby said lower end portions automatically move toward each other toward a collapsed position of said one upstanding means.

20. A device for forming a clamp of refuse or refuse-clarified sludge mixtures in reduced and prepared form for composting by thermal rotting comprising a pair of transversely spaced upstanding means defining a space therebetween for receiving refuse, support means disposed between said pair of upstanding means for receiving thereupon and supporting the received refuse, means for facilitating the removal of said upstanding means away from said support means whereby refuse received upon said support means is supported upon the latter in the absence of said upstanding means, at least one of said pair of upstanding means is defined by a pair of upstanding elongated members having upper and lower end portions, hinge means at said upper end portions for bringing together said elongated members thereby selectively varying the distance between the lower end portions thereof, means for elevating said one upstanding means whereby said lower end portions automatically move toward each other toward a collapsed position of said one upstanding means, said elevating means being movable between operative and inoperative positions relative to said one upstanding means, said elevating means being a carriage assembly having a handle and a lifting arm disposed in angular relationship to each other, an end portion of said arm being adapted to contact said one upstanding means contiguous said hinge means, and wheel means for moving said carriage assembly and defining a fulcrum whereby a force applied to said handle moves said arm end portion for elevating said one upstanding means.

* * * * *